United States Patent
Bayareddy et al.

(10) Patent No.: US 9,471,402 B1
(45) Date of Patent: Oct. 18, 2016

(54) SYSTEMS AND METHODS FOR FACILITATING DEPENDENCY-ORDERED DELIVERY OF DATA SETS TO APPLICATIONS WITHIN DISTRIBUTED SYSTEMS

(71) Applicant: Juniper Networks, Inc., Sunnyvale, CA (US)

(72) Inventors: Srinath Bayareddy, San Jose, CA (US); Aditya Thakur, Ottawa (CA); Pramod Srinivasan, San Jose, CA (US); Robert Rodgers, Mountain View, CA (US); Srivatsan Rajagopal, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/666,266

(22) Filed: Mar. 23, 2015

(51) Int. Cl.
  G06F 3/00 (2006.01)
  G06F 9/44 (2006.01)
  G06F 9/46 (2006.01)
  G06F 13/00 (2006.01)
  G06F 9/54 (2006.01)

(52) U.S. Cl.
  CPC .............. *G06F 9/542* (2013.01); *G06F 9/546* (2013.01)

(58) Field of Classification Search
  CPC ..................................................... G06F 9/542
  USPC ......................................................... 719/320
  See application file for complete search history.

(56) References Cited

U.S. PATENT DOCUMENTS

| | | | |
|---|---|---|---|
| 6,161,125 A | 12/2000 | Traversat et al. | |
| 6,611,519 B1 | 8/2003 | Howe | |
| 6,704,801 B1 * | 3/2004 | Minyard | G06F 9/542 713/375 |
| 7,649,884 B1 | 1/2010 | Ahmed et al. | |
| 2004/0052266 A1 * | 3/2004 | Meyer | H04Q 11/0478 370/412 |

OTHER PUBLICATIONS

Paruchuri et al, "Optimal Flooding Protocol for Routing in Adhoc Networks", Jun. 7, 2010.*
Srinath Bayareddy, et al; Systems and Methods for Facilitating Atomic Delivery of Bundled Data Sets to Applications Within Distributed Systems; U.S. Appl. No. 14/666,261, filed Mar. 23, 2015.
"What is Cisco IOS XE", http://www.cisco.com/c/en/us/products/collateral/ios-nx-os-software/ios-xe-3sg/QA_C67-622903.html, as accessed Feb. 12, 2015, Cisco, Forwarding and Feature Manager in IOS XE, (May 2012).
Srinath Bayareddy, et al.; Systems and Methods for Facilitating Atomic Delivery of Bundled Data Sets to Applications Within Distributed Systems; U.S. Appl. No. 15/058,345, filed Mar. 2, 2016.

* cited by examiner

*Primary Examiner* — Timothy A Mudrick
(74) *Attorney, Agent, or Firm* — ALG Intellectual Property, LLC

(57) ABSTRACT

The disclosed computer-implemented method for facilitating dependency-ordered delivery of data sets to applications within distributed systems may include (1) receiving, at a queue of an application running within a distributed system, a data set from at least one other application running within the distributed system, (2) determining that the data set has a dependency on at least one other data set that has yet to arrive, (3) gating the data set at the queue due at least in part to the dependency, (4) receiving, at the queue, the other data set from the other application, (5) determining that the dependency has been satisfied, and then (6) delivering the data set and the other data set to the application to enable the application to process the data set and the other data set in accordance with the dependency. Various other methods, systems, and computer-readable media are also disclosed.

18 Claims, 6 Drawing Sheets

SYSTEMS AND METHODS FOR FACILITATING DEPENDENCY-ORDERED DELIVERY OF DATA SETS TO APPLICATIONS WITHIN DISTRIBUTED SYSTEMS

BACKGROUND

Applications running within a computing environment may send certain data and/or objects (sometimes also referred to as "state") to one another. For example, a first application running within a traditional computing environment may produce configuration and/or operational data for consumption by a second application running within the computing environment. Upon producing the configuration and/or operational data, the first application may send the configuration and/or operational data to the second application for consumption.

Unfortunately, the applications and/or the traditional computing environment itself may have certain shortcomings and/or limitations that negatively impact efficiency and/or scaling within such a computing environment. For example, the configuration and/or operational data sent by the first application may have certain dependencies on other data and/or objects. As a result, the second application may be unable to properly consume the configuration and/or operational data without the other data and/or objects. To satisfy these dependencies, the other data and/or objects may need to be delivered to the second application along with the configuration and/or operational data so that the second application is able to properly consume the configuration and/or operation data.

Continuing with this example, the traditional computing environment may include and/or provide a centralized dependency management unit that performs these dependency evaluations on the data and/or objects transferred between the applications. For example, the traditional computing environment's centralized dependency management unit may determine when the configuration and/or operational data's dependencies on the other data and/or objects have been satisfied prior to delivery to the second application. Unfortunately, the use of this centralized dependency management unit may lead to performance bottlenecks and/or inefficiencies, especially as the number of applications and/or data transfers increases within the traditional computing environment.

The instant disclosure, therefore, identifies and addresses a need for systems and methods for facilitating dependency-ordered delivery of data sets to applications within distributed systems.

SUMMARY

As will be described in greater detail below, the instant disclosure describes various systems and methods for facilitating dependency-ordered delivery of data sets to applications within distributed systems by providing application-specific input queues that perform dependency evaluations and/or gating on behalf of the applications without using centralized dependency management units.

In one example, a computer-implemented method for facilitating dependency-ordered delivery of data sets to applications within distributed systems may include (1) receiving, at a queue of an application running within a distributed system, a data set from at least one other application running within the distributed system, (2) determining that the data set received from the other application has a dependency on at least one other data set that has yet to arrive at the queue of the application, (3) gating, due at least in part to the dependency, the data set at the queue of the application at least until the other data set arrives at the queue of the application, (4) receiving, at the queue of the application, the other data set from the other application running within the distributed system, (5) determining that the dependency has been satisfied based at least in part on receiving the other data set at the queue of the application, and then in response to determining that the dependency has been satisfied, (6) delivering the data set and the other data set to the application to enable the application to process the data set and the other data set in accordance with the dependency.

In one embodiment, a system for implementing the above-described method may include a receiving module that receives, at a queue of an application running within a distributed system, a data set from at least one other application running within the distributed system. The system may also include a determination module that determines, at the queue of the application, that the data set received from the other application has a dependency on at least one other data set that has yet to arrive at the queue of the application. The system may further include a gating module that gates, due at least in part to the dependency, the data set at the queue of the application at least until the other data set arrives at the queue of the application. In this embodiment, the receiving module may also receive, at the queue of the application, the other data set from the other application running within the distributed system. The determination module may further determine that the dependency has been satisfied based at least in part on receiving the other data set at the queue of the application. The system may additionally include a delivery module that delivers, in response to the determination that the dependency has been satisfied, the data set and the other data set to the application to enable the application to process the data set and the other data set in accordance with the dependency. Finally, the system may include at least one physical processor that executes the receiving module, the determination module, the gating module, and the delivery module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a queue of an application running within a distributed system, a data set from at least one other application running within the distributed system, (2) determine that the data set received from the other application has a dependency on at least one other data set that has yet to arrive at the queue of the application, (3) gate, due at least in part to the dependency, the data set at the queue of the application at least until the other data set arrives at the queue of the application, (4) receive, at the queue of the application, the other data set from the other application running within the distributed system, (5) determine that the dependency has been satisfied based at least in part on receiving the other data set at the queue of the application, and then (6) deliver, in response to the determination that the dependency has been satisfied, the data set and the other data set to the application to enable the application to process the data set and the other data set in accordance with the dependency.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
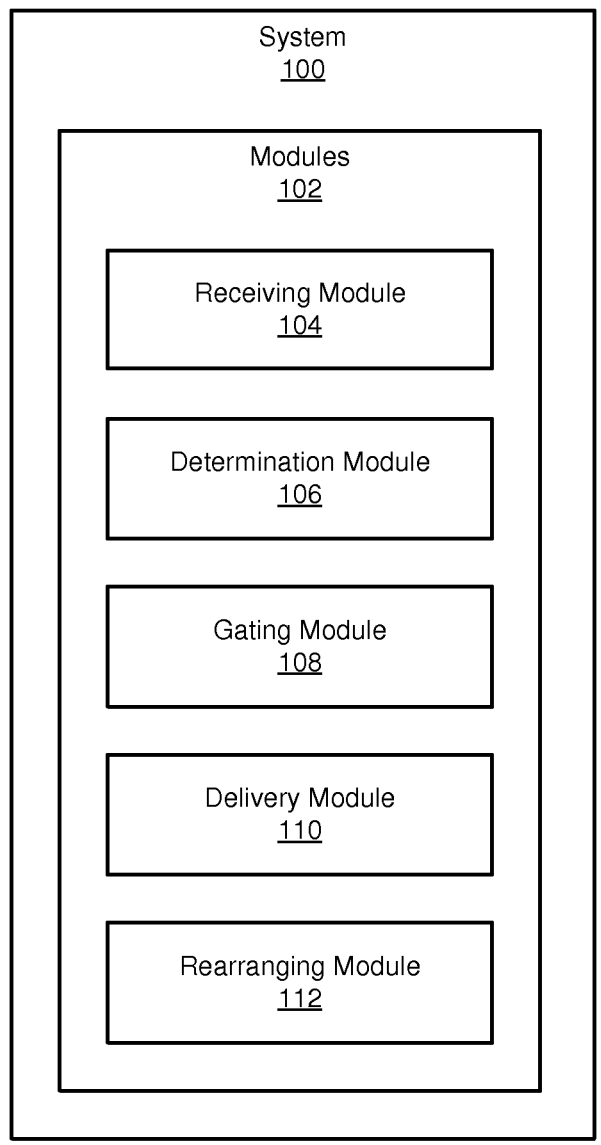
FIG. 1 is a block diagram of an exemplary system for facilitating dependency-ordered delivery of data sets to applications within distributed systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for facilitating dependency-ordered delivery of data sets to applications within distributed systems. As will be explained in greater detail below, by providing application-specific input queues that perform dependency evaluations and/or gating on behalf of applications within a distributed system, the systems and methods described herein may be able to deliver dependency-ordered data sets to those applications without using a centralized dependency management unit. By delivering dependency-ordered data sets to such applications in this way, the systems and methods described herein may be able to improve the distributed system by avoiding certain shortcomings and/or limitations that result from using a centralized dependency management unit. For example, the systems and methods described herein may help increase the efficiency and/or scaling of the distributed system, especially as the number of applications and/or data transfers increases within the distributed system.

Figure 2:
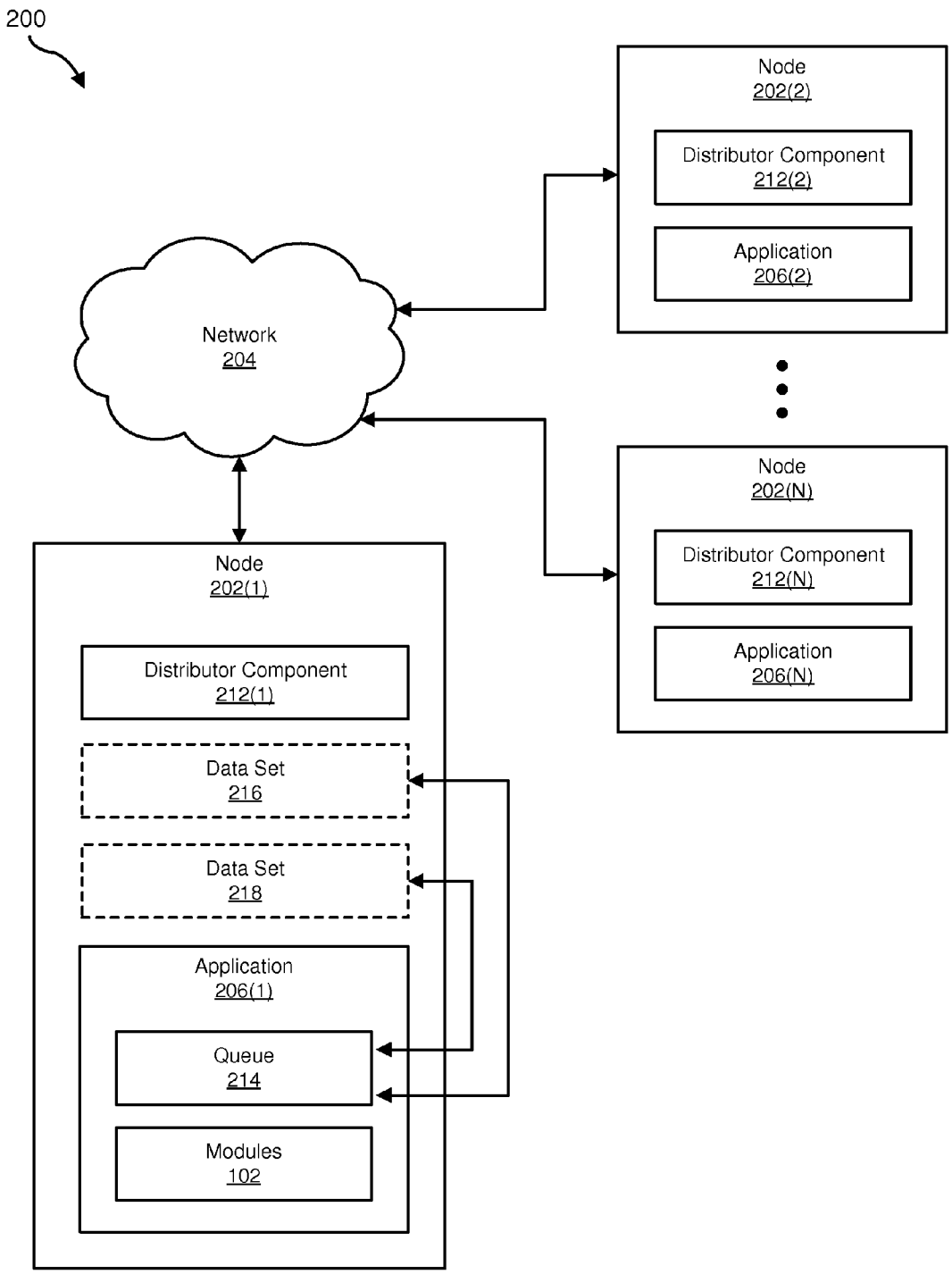
FIG. 2 is a block diagram of an additional exemplary system for facilitating dependency-ordered delivery of data sets to applications within distributed systems.

The following will provide, with reference to FIGS. 1 and 2, detailed descriptions of exemplary systems for facilitating dependency-ordered delivery of data sets to applications within distributed systems. Detailed descriptions of corresponding computer-implemented methods will be provided in connection with FIG. 3. Detailed descriptions of exemplary metadata of data sets and an exemplary order in which data sets may be delivered to an application will be provided in connection with FIGS. 4 and 5, respectively. In addition, detailed descriptions of an exemplary computing system capable of implementing one or more of the embodiments described herein will be provided in connection with FIG. 6.

FIG. 1 is a block diagram of an exemplary system 100 for facilitating dependency-ordered delivery of data sets to applications within distributed systems. As illustrated in this figure, exemplary system 100 may include one or more modules 102 for performing one or more tasks. For example, and as will be explained in greater detail below, exemplary system 100 may include a receiving module 104 that receives, at a queue of an application running within a distributed system, a data set from at least one other application running within the distributed system. Exemplary system 100 may also include a determination module 106 that determines that the data set received from the other application has a dependency on at least one other data set that has yet to arrive at the queue of the application.

In addition, and as will be described in greater detail below, exemplary system 100 may include a gating module 108 that gates, due at least in part to the dependency, the data set at the queue of the application at least until the other data set arrives at the queue of the application. In some examples, receiving module 104 may further receive, at the queue of the application, the other data set from the other application running within the distributed system. In such examples, determination module 106 may further determine that the dependency has been satisfied based at least in part on receiving the other data set at the queue of the application.

Moreover, exemplary system 100 may include a delivery module 110 that delivers, in response to the determination that the dependency has been satisfied, the data set and the other data set to the application to enable the application to process the data set and the other data set in accordance with the dependency. Additionally or alternatively, exemplary system 100 may include a rearranging module 112 that rearranges, at the queue of the application, an order of the data set and the other data set in accordance with the dependency. Although illustrated as separate elements, one or more of modules 102 in FIG. 1 may represent portions of a single module or application (e.g., a network operating system (such as JUNIPER NETWORKS' JUNOS OPERATING SYSTEM and/or CISCO'S IOS)).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., node 202(1) and/or nodes 202(2)-(N)), computing system 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary distributed system 200 in FIG. 2. The term "distributed system," as used herein, generally refers to any type or form of computing environment that includes a plurality of nodes executing applications that interface and/or collaborate with one another. In one example, distributed system 200 may provide a computing environment in which applications have no guarantee of any specific ordering of data sets being delivered for processing and/or consumption (even though such data sets may have certain dependencies on one another).

As shown in FIG. 2, distributed system 200 may include a node 202(1) in communication with one or more of nodes 202(2)-(N) via a network 204. In one example, node 202(1) may be programmed with one or more of modules 102 to facilitate dependency-ordered delivery of data sets to applications within distributed systems. Additionally or alternatively, one or more of nodes 202(2)-(N) may be programmed with one or more of modules 102 (although not necessarily illustrated as such in FIG. 2) to facilitate dependency-ordered delivery of data sets to applications within distributed systems.

As illustrated in FIG. 2, nodes 202(1)-(N) may include and/or execute applications 206(1)-(N), respectively, that interface and/or collaborate with one another in certain ways. In some examples, application 206(1) may include a queue 214 that receives, gates, rearranges, and/or delivers data sets in connection with application 206(1). Additionally or alternatively, queue 214 may reside outside of application 206(1) and facilitate dependency-ordered delivery of data sets to application 206(1) by receiving, gating, rearranging, and/or delivering such data sets. Applications 206(2)-(N) may also include an instance of queue 214 (although not necessarily illustrated as such in FIG. 2).

In some examples, application 206(1) may include and/or be programmed with one or more of modules 102. For example, one or more of modules 102 may be integrated into queue 214. Additionally or alternatively, one or more of modules 102 may reside inside of application 206(1) but outside of queue 214. Applications 206(2)-(N) may also include and/or be programmed with one or more of modules 102 (although not necessarily illustrated as such in FIG. 2). Moreover, although illustrated as running on separate nodes in FIG. 2, application 206(1) and one or more of applications 206(2)-(N) may alternatively run on a single node (such as node 202(1)) within distributed system 200.

As illustrated in FIG. 2, nodes 202(1)-(N) may include and/or execute distributor components 212(1)-(N), respectively, that facilitate transferring data sets within distributed system 200 via network 204. In one example, node 202(1) may include data sets 216 and 218 received at different points in time from one or more of nodes 202(1)-(N) via network 204.

In one embodiment, one or more of modules 102 from FIG. 1 may, when executed by at least one processor of node 202(1), enable node 202(1) to facilitate dependency-ordered delivery of data sets to applications within distributed system 200. For example, and as will be described in greater detail below, one or more of modules 102 may cause node 202(1) to (1) receive, at queue 214 of application 206(1) running within distributed system 200, data set 216 from application 206(1) running within the distributed system 200, (2) determine that data set 216 received has a dependency on data set 218 that has yet to arrive at queue 214 of application 206(1), (3) gate, due at least in part to the dependency, data set 216 at queue 214 of application 206(1) at least until data set 218 arrives at queue 214 of application 206(1), (4) receive, at queue 214 of application 206(1), data set 218 from one of applications 206(2)-(N) running within distributed system 200, (5) determine that the dependency has been satisfied based at least in part on receiving data set 218 at queue 214 of application 206(1), and then (6) deliver, in response to the determination that the dependency has been satisfied, data sets 216 and 218 to application 206(1) to enable application 206(1) to process data sets 216 and 218 in accordance with the dependency.

Nodes 202(1)-(N) generally represent any type or form of physical and/or virtual computing environment capable of running within a distributed system. In one example, nodes 202(1)-(N) may each include and/or represent a physical computing device. In another example, one or more of nodes 202(1)-(N) may include and/or represent a virtual machine running on a physical computing device. In some examples, multiple nodes within nodes 202(1)-(N) may include and/or represent multiple virtual machines running on a single physical computing device. Examples of nodes 202(1)-(N) include, without limitation, routers, switches, bridges, network hubs, gateways, servers, laptops, tablets, desktops, cellular phones, Personal Digital Assistants (PDAs), multimedia players, embedded systems, wearable devices (e.g., smart watches, smart glasses, etc.), gaming consoles, virtual machines running on one or more of the same, variations of one or more of the same, combinations of one or more of the same, exemplary computing system 600 in FIG. 6, or any other suitable node.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 204 may facilitate communication or data transfer using wireless or wired connections. In one embodiment, network 204 may facilitate communication among nodes 204(1)-(N). Although nodes 202(1)-(N) and network 204 are illustrated as separate entities in FIG. 2, nodes 202(1)-(N) may alternatively include and/or represent portions of network 204.

Applications 206(1)-(N) generally represent any type or form of software, application, and/or program capable of running in a physical and/or virtual computing environment. In some examples, output originating from one of applications 206(1)-(N) may be used as input for another one of applications 206(1)-(N). Examples of applications 206(1)-(N) include, without limitation, control-plane applications, services-plane applications, traffic-transforming applications, traffic-monitoring applications (such as MONITUBE), load-balancing and/or traffic-classification applications (such as EQUILIBRIUM), third-party applications capable of running on a network operating system (such as JUNIPER NETWORKS' JUNOS OPERATING SYSTEM and/or CISCO'S IOS), variations of one or more of the same, combinations of one or more of the same, or any other suitable applications.

Distributor components 212(1)-(N) generally represent any type or form of unit, module, and/or mechanism that facilitates data transfer for one or more applications running on a node within a distributed system. In some examples, distributor components 212(1)-(N) may each correspond to a specific node. In other words, each node may include a single distributor component that facilitates data transfer for all of the applications (whether singular or multiple) running on that particular node. In one example, distributor component 212(1) may reside on node 202(1) and facilitate data transfer on behalf of application 206(1) with respect to distributed system 200. In this example, distributor component 212(2) may reside on node 202(2) and facilitate data transfer on behalf of application 206(2) with respect to distributed system 200. Similarly, distributor component 212(N) may reside on node 202(N) and facilitate data transfer on behalf of application 206(N) with respect to distributed system 200.

Queue 214 generally represents any type or form of physical and/or logical storage device and/or mechanism that stores, maintains, and/or gates data. In one example, queue 214 may include and/or represent a buffer that temporarily stores data sets intended for consumption by application 206(1). Additionally or alternatively, queue 214 may include a library used by application 206(1) to ensure dependency-ordered delivery of data to application 206(1). Queue 214 may sometimes be referred to as a binding queue or an input queue. Examples of queues 214 include, without limitation, physical and/or logical representations of On Chip Memory (OCM), Random Access Memory (RAM), Dynamic Random Access Memory (DRAM), Static Random Access Memory (SRAM), Synchronous Dynamic Random Access Memory (SDRAM), flash memory, memory buffers, portions of one or more of the same, variations of one or more of the same, combinations of one or more of the same, or any other suitable queue.

Data sets 216 and 218 generally represent any type or form of encapsulated data, object, and/or information. In some examples, data sets 216 and/or 218 may include and/or represent input that queue 214 is to deliver to application 206(1) once the data sets' dependencies have been satisfied. In one example, data set 216 may have one or more dependencies on data set 218. As a result, application 206(1) may be unable to properly process and/or consume data set 216 without data set 218. To satisfy these dependencies, data set 218 may need to be delivered to application 206(1) along with data set 216 so that application 206(1) is able to properly process and/or consume data set 216. Examples of data sets 216 and 218 include, without limitation, configuration data, operational data, routing data, traffic statistical data, variations of one or more of the same, combinations of one or more of the same, or any other suitable data sets.

Figure 3:
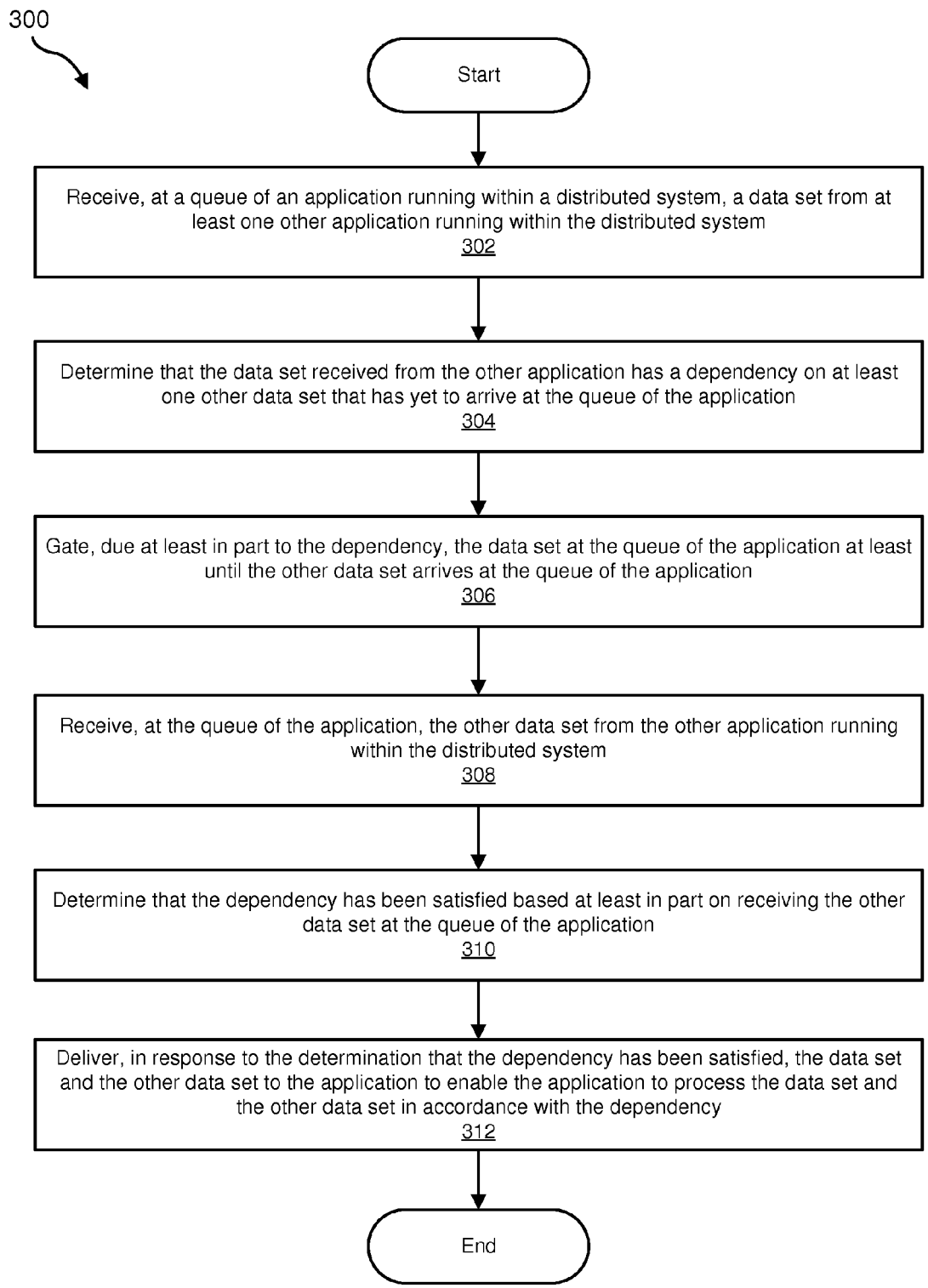
FIG. 3 is a flow diagram of an exemplary method for facilitating dependency-ordered delivery of data sets to applications within distributed systems.

FIG. 3 is a flow diagram of an exemplary computer-implemented method 300 for facilitating dependency-ordered delivery of data sets to applications within distributed systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 600 in FIG. 6.

As illustrated in FIG. 3, at step 302 one or more of the systems described herein may receive, at a queue of an application running within a distributed system, a data set from at least one other application running within the distributed system. For example, receiving module 104 may, as part of node 202(1) in FIG. 2, receive data set 216 at queue 214 of application 206(1) running on node 202(1) within distributed system 200. In this example, data set 216 may have originated from application 206(2) running on node 202(2) within distributed system 200.

The systems described herein may perform step 302 in a variety of ways and/or contexts. In some examples, receiving module 104 may receive data set 216 while waiting for data sets to arrive at queue 214 for processing and/or consumption by application 206(1). In other examples, receiving module 104 may receive data set 216 by querying another application for data sets to be processed and/or consumed by application 206(1).

In one example, receiving module 104 may receive data set 216 through distributor component 212(1) residing on node 202(1). For example, application 206(2) may direct distributor component 212(2) to send data set 216 to node 202(1) via network 204 using an Optimal Flooding Protocol (OFP). As data set 216 arrives at node 202(1), distributor component 212(1) may obtain data set 216 and then feed and/or place data set 216 into queue 214.

In one example, data set 216 may include and/or represent an encapsulated data object outputted by application 206(2). In this example, application 206(2) may have outputted the encapsulated object in response to input processed and/or consumed by application 206(2).

Returning to FIG. 3, at step 304 one or more of the systems described herein may determine that the data set received from the other application has a dependency on at least one other data set that has yet to arrive at the queue of the application. For example, determination module 106 may, as part of node 202(1) in FIG. 2, determine that data set 216 received from application 206(2) has a dependency on data set 218 that has yet to arrive at queue 214 of application 206(1).

The term "dependency," as used herein, generally refers to any type or form of state and/or condition that is necessary for the proper function, processing, and/or consumption of data. Examples of such a dependency include, without limitation, delivery and/or processing of a data set together with at least one other data set, delivery and/or processing of a specific ordering and/or arrangement of data sets, delivery and/or processing of a data set together with a specific version (e.g., an updated version) of another other data set, delivery and/or processing of a data set together with any version of another other data set, variations of one or more of the same, combinations of one or more of the same, or any other suitable data sets.

The systems described herein may perform step 304 in a variety of ways and/or contexts. In some examples, determination module 106 may determine that data set 216 has a dependency on data set 218 based at least in part on metadata of data set 216. In one example, receiving module 104 may obtain the metadata of data set 216 from application 206(2). For example, receiving module 104 may receive the metadata of data set 216 in a separate exchange with application 206(2). In this example, the metadata of data set 216 may travel from node 202(2) to node 202(1) as a distinct communication. Accordingly, the metadata of data set 216 may be hoisted and/or maintained outside of data set 216 itself and/or described in a generic format (via, e.g., a domain-specific language). As a result, distributed system 200 may represent a data-type-agnostic and/or application-agnostic solution that enables applications to process and/or consume data sets transferred without a centralized dependency management unit.

Once metadata of data set 216 has arrived at node 202(1), determination module 106 may search the metadata of data set 216 for any dependencies of data set 216. In this example, while searching the metadata of data set 216, determination module 106 may identify a dependency that data set 216 has on data set 218.

Figure 4:
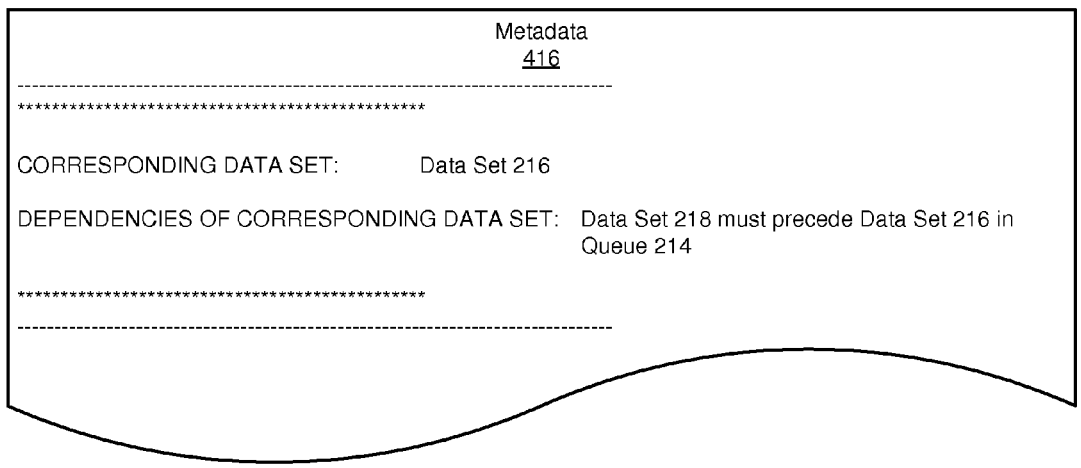
FIG. 4 is an illustration of exemplary metadata of data sets received from at least one application within a distributed system.
Figure 4:
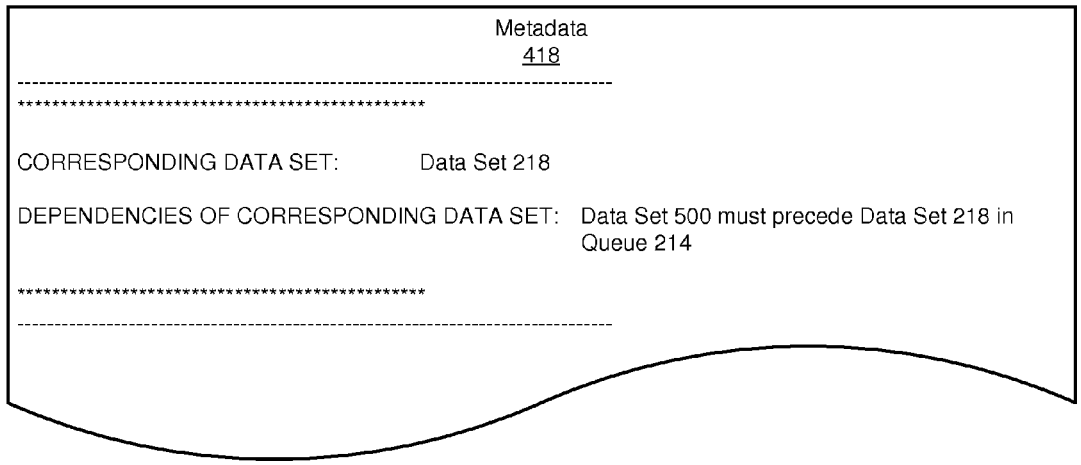

As a specific example, determination module 106 may determine that data set 216 has a dependency on data set 218 based at least in part on metadata 416 in FIG. 4. As illustrated in FIG. 4, metadata 416 may identify a corresponding data set (in this example, "Data Set 216") and one or more dependencies of the corresponding data set (in this example, "Data Set 218 must precede Data Set 216 in Queue 214"). In this example, determination module 106 may search metadata 416 of data set 216 for any dependencies of data set 216. In this example, by searching the metadata 416 in this way, determination module 106 may determine that data set 218 must precede data set 216 in queue 214 such that data set 218 is delivered to application 206(1) before data set 216.

Returning to FIG. 3, at step 306 one or more of the systems described herein may gate, due at least in part to the dependency, the data set at the queue of the application at least until the other data set arrives at the queue of the application. For example, gating module 108 may, as part of node 202(1) in FIG. 2, gate data set 216 at queue 214 of application 206(1) at least until data set 218 arrives at queue 214 of application 206(1). The phrase "to gate" or "gating," as used herein, generally refers to any type or form of process and/or procedure that involves storing and/or maintaining one or more data sets until the data sets' dependencies have been satisfied.

The systems described herein may perform step 306 in a variety of ways and/or contexts. In some examples, gating module 108 may gate data set 216 at queue 214 of application 206(1) by waiting for certain data sets to arrive at queue 214. For example, gating module 108 may wait for data set 218 to arrive at queue 214 to ensure that the dependency of data set 216 is satisfied before delivery to application 206(1). Additionally or alternatively, gating module 108 may wait for data set 216 and data set 218 to be rearranged into a specific order at queue 214 to ensure that the dependency of data set 216 is satisfied before delivery to application 206(1).

Returning to FIG. 3, at step 308 one or more of the systems described herein may receive, at the queue of the application, the other data set from the other application running within the distributed system. For example, receiving module 104 may, as part of node 202(1) in FIG. 2, receive data set 218 at queue 214 of application 206(1). In this example, data set 218 may have originated from application 206(2) running on node 202(2) within distributed system 200. Additionally or alternatively, data set 218 may have originated from application 206(N) running on node 202(N) within distributed system 200.

The systems described herein may perform step 308 in a variety of ways and/or contexts. In some examples, receiving module 104 may receive data set 218 while waiting for data sets to arrive at queue 214 for processing and/or consumption by application 206(1). In other examples, receiving module 104 may receive data set 218 by querying another application for data sets to be processed and/or consumed by application 206(1).

In one example, receiving module 104 may receive data set 218 through distributor component 212(1) residing on node 202(1). For example, application 206(2) or 206(N) may direct distributor component 212(2) or 212(N) to send data set 218 to node 202(1) via network 204 using an OFP protocol. As data set 218 arrives at node 202(1), distributor component 212(1) may obtain data set 218 and then feed and/or place data set 218 into queue 214.

Returning to FIG. 3, at step 310 one or more of the systems described herein may determine that the dependency has been satisfied based at least in part on receiving the other data set at the queue of the application. For example, determination module 106 may, as part of node 202(1) in FIG. 2, determine that the dependency of data set 216 has been satisfied based at least in part on the receipt of data set 218.

The systems described herein may perform step 310 in a variety of ways and/or contexts. In some examples, determination module 106 may determine that the dependency of data set 216 has been satisfied by ensuring that data sets 216 and 218 have both arrived at queue 214 of application 206(1). Additionally or alternatively, determination module 106 may determine that the dependency of data set 216 has been satisfied by ensuring that data sets 216 and 218 are arranged in a specific order within queue 214 for processing and/or consumption by application 206(1).

As a specific example, the dependency of data set 216 may require data set 218 to be positioned ahead of data set 216 within queue 214 of application 206(1) such that data set 218 is processed and/or consumed before data set 216 upon delivery to application 206(1). However, determination module 106 may determine that data set 216 is positioned ahead of data set 218 within queue 214 of application 206(1) such that data set 216 would be processed and/or consumed before data set 218 upon delivery to application 206(1). To satisfy this dependency, one or more of the systems described herein may rearrange data sets 216 and 218 in the order specified by the dependency of data set 216. For example, rearranging module 112 may, as part of node 202(1), rearrange the order of data sets 216 and 218 in accordance with the dependency of data set 216. In this example, rearranging module 112 may rearrange the order of data sets 216 and 218 such that data set 218 is positioned ahead of data set 216 within queue 214 of application 206(1).

In some examples, determination module 106 may determine that the dependency of data set 216 has been satisfied by ensuring that a specific version of data set 218 has arrived at queue 214 of application 206(1). For example, the dependency of data set 216 may require the most up-to-date version of data set 218 to be delivered to application 206(1) along with data set 216. As a result, gating module 108 may continue gating data set 216 at queue 214 of application 206(1) even after an outdated version of data set 218 has arrived at node 202(1). Once the most up-to-date version of data set 218 arrives at queue 214 of application 206(1), determination module 106 may determine that this dependency of data set 216 has been satisfied.

In other examples, determination module 106 may determine that the dependency of data set 216 has been satisfied by ensuring that at least one version of data set 218 has arrived at queue 214 of application 206(1). For example, the dependency of data set 216 may require any version of data set 218 to be delivered to application 206(1) along with data set 216. As a result, once any version (even an outdated version) of data set 218 arrives at queue 214 of application 206(1), determination module 106 may determine that this dependency of data set 216 has been satisfied.

In some examples, determination module 106 may determine that the dependency of data set 216 has been satisfied by ensuring that all further dependencies stemming from the dependency of data set 218 have been satisfied. For example, determination module 106 may determine that data set 218 has a different dependency on at least one further data set that has yet to arrive at queue 214 of application 206(1). In this example, receiving module 104 may later receive the further data set at queue 214 of application 206(1) from one of applications 206(1)-(N). Determination module 106 may then determine that the dependency of data set 218 has been satisfied based at least in part on the receipt of the further data set. Additionally or alternatively, determination module 106 may determine that the dependency of data set 216 has been satisfied based at least in part on the receipt of the further data set.

Figure 5:
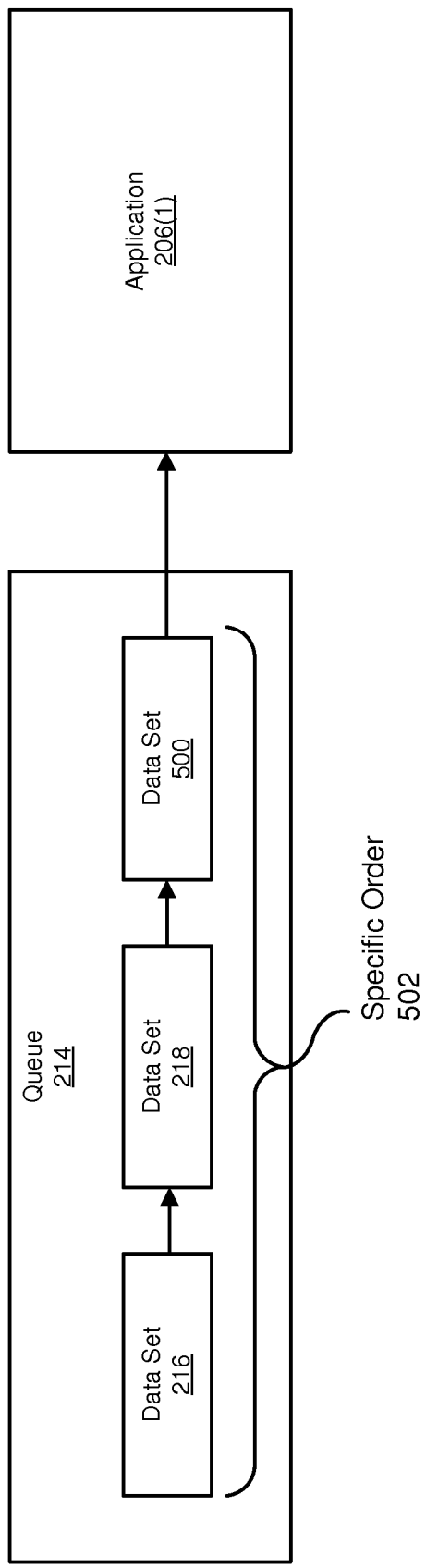
FIG. 5 is an illustration of an exemplary order in which data sets may be delivered to an application within a distributed system.

As a specific example, determination module 106 may determine that data set 218 has a dependency on a data set 500 in FIG. 5 based at least in part on metadata 418 in FIG.

4. As illustrated in FIG. 4, metadata 416 may identify a corresponding data set (in this example, "Data Set 218") and one or more dependencies of the corresponding data set (in this example, "Data Set 500 must precede Data Set 216 in Queue 214"). In this example, determination module 106 may search metadata 418 of data set 218 for any dependencies of data set 218. By searching the metadata 418 in this way, determination module 106 may determine that data set 500 must precede data set 216 in queue 214 such that data set 500 is delivered to application 206(1) before data set 218. Accordingly, gating module 108 may continue gating data sets 216 and 218 at queue 214 of application 206(1) until both data set 500 has arrived at queue 214 of application 206(1).

Continuing with this example, rearranging module 112 may rearrange data sets 216, 218, and/or 500 in a specific order 502 in FIG. 5 in accordance with the dependencies of data sets 216 and 218. For example, rearranging module 112 may rearrange data sets 216, 218, and/or 500 such that data set 500 is positioned ahead of data sets 216 and 218 and data set 218 is positioned between data sets 216 and 500 within queue 214 of application 206(1). By rearranging data sets 216, 218, and/or 500 in this way, rearranging module 112 may place data sets 216, 218, and/or 500 in specific order 502 in FIG. 5 to comply with the dependencies of data sets 216 and 218. Determination module 106 may then determine that the dependencies of data sets 216 and 218 have been satisfied based at least in part on the rearrangement of data sets 216, 218, and/or 500 in specific order 502 in FIG. 5.

Accordingly, queue 214 of application 206(1) may enable application 206(1) to process and/or consume data sets 216, 218, and 500 in specific order 502 in accordance with the dependencies of data sets 216 and 218. Queue 214 of application 206(1) may facilitate such processing and/or consumption of data sets 216, 218, and 500 irrespective of the order in which data sets 216, 218, and 500 arrive at queue 214 of application 206(1). Additionally or alternatively, queue 214 of application 206(1) may facilitate such processing and/or consumption of data sets 216, 218, and 500 irrespective of the order in which applications 206(2)-(N) send data sets 216, 218, and 500 to application 206(1).

In some examples, determination module 106 may override a dependency of data set 216 or 218 in the event that the dependency does not apply to application 206(1). In other words, determination module 106 may prune a dependency of data set 216 or 218 around the interests of application 206(1). For example, in the event that application 206(1) is not interested in data set 500, determination module 106 may essentially prune the dependency of data set 218 such that data sets 216 and 218 are delivered to application 206(1) without data set 500. In this example, determination module 106 may decide to perform this type of pruning based at least in part on certain intelligence from application 206(1). Accordingly, while the dependencies of data sets 216 and 218 may, by default, be specified and/or selected by the application that sends data sets 216 and 218 to application 206(1), application 206(1) may alternatively have overriding authority to prune, disregard, and/or modify the dependencies specified and/or selected by the sending application.

Returning to FIG. 3, at step 312 one or more of the systems described herein may deliver, in response to determining that the dependency has been satisfied, the data set and the other data set to the application to enable the application to process the data set and the other data set in accordance with the dependency. For example, delivery module 110 may, as part of node 202(1) in FIG. 2, deliver data sets 216 and 218 to application 206(1) to process and/or consume data sets 216 and 218 in accordance with the dependency. In this example, delivery module 110 may initiate the delivery of data sets 216 and 218 in response to the determination that the dependency has been satisfied. The phrase "to process" or "to consume," as used herein with reference to an application, generally refers to any type or form of operation and/or task performed by the application using certain data sets as inputs, variables, and/or arguments for the operation and/or task.

The systems described herein may perform step 312 in a variety of ways and/or contexts. In one example, delivery module 110 may deliver data sets 216 and 218 to application 206(1) by feeding data sets 216 and 218 to application 206(1) for processing and/or consumption. For example, delivery module 110 may feed data sets 216, 218, and 500 in FIG. 5 to application 206(1) for processing and/or consumption in specific order 502.

Additionally or alternatively, delivery module 110 may direct gating module 108 to ungate data sets 216 and 218 from queue 214 to facilitate delivery of data sets 216 and 218 to application 206(1). For example, delivery module 110 may notify gating module 108 that the dependency of data set 216 has been satisfied. In response to this notification, gating module 108 may ungate data sets 216 and 218 by opening queue 214 such that data sets 216 and 218 are delivered to application 206(1).

In some examples, method 300 may include one or more additional steps not illustrated in FIG. 3. For example, delivery module 110 may direct distributor component 212(1) to send a data set (not necessarily illustrated in FIG. 2) to one of distributor components 212(2)-(N) using an OFP protocol. By directing distributor component 212(1) to send the data set in this way, delivery module 110 may enable the data set to reach one of applications 206(2)-(N) without travelling through or using a centralized dependency management unit for delivery to that application. In one example, the data set sent by distributor component 212(1) may include and/or represent output originating from application 206(1) for use as input to one of applications 206(2)-(N).

Additionally or alternatively, modules 102 may provide queue 214 to application 206(1) and/or certain dependency-ordering functions to queue 214. By providing queue 214 to application 206(1) and/or such dependency-ordering functions to queue 214 in this way, modules 102 may be able to facilitate dependency-ordered delivery of data sets 216 and 218 to application 206(1) without a centralized dependency management unit.

Figure 6:
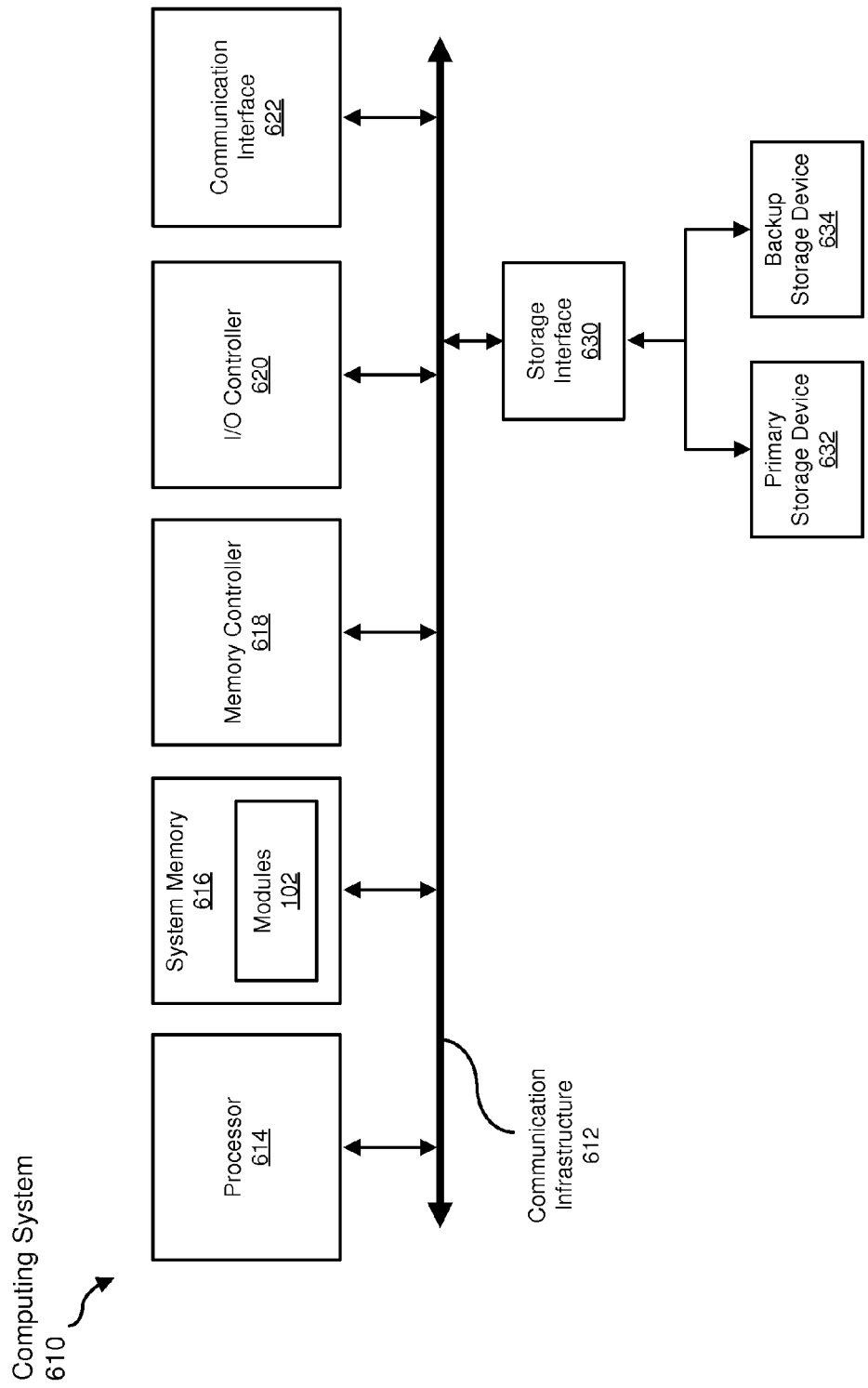
FIG. 6 is a block diagram of an exemplary computing system capable of implementing one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, network devices (e.g., wireless WLAN controllers, master APs, etc.), workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing.

For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of distributed system 200 in FIG. 2 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or other networking functionality.

In addition, one or more of the modules described herein may transform data, physical devices, and/or representations of physical devices from one form to another. For example, one or more of the modules recited herein may receive a data set to be transformed, transform the data set into a combined data set that includes another data set, output a result of the transformation that complies with a dependency of the data set, use the result of the transformation as input for an application in accordance with the dependency, and deliver the result of the transformation to the application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a queue of an application running on a node within a distributed system, a data set from at least one other application running on another node within the distributed system via an Optimal Flooding Protocol (OFP);

obtaining metadata of the data set that is:
  described in a domain-specific language; and
  hoisted outside of the data set;
determining, based at least in part on the metadata of the data set, that the data set received from the other application running on the other node has a dependency on at least one other data set that has yet to arrive at the queue of the application, wherein the dependency requires a most up-to-date version of the other data set;
gating, due at least in part to the dependency, the data set at the queue of the application running on the node at least until the most up-to-date version of the other data set arrives at the queue of the application running on the node;
receiving, at the queue of the application running on the node, the other data set from the other application running on the other node within the distributed system;
determining that the dependency has been satisfied based at least in part on receiving the other data set at the queue of the application running on the node; and
in response to determining that the dependency has been satisfied, delivering the data set and the other data set to the application running on the node to enable the application to process the data set and the other data set in accordance with the dependency.

2. The method of claim 1, wherein determining that the data set received from the other application has the dependency on the other data set comprises:
  searching the metadata for any dependencies of the data set received from the other application; and
  while searching the metadata, identifying the data set's dependency on the other data set.

3. The method of claim 1, further comprising:
  determining, at the queue of the application, that the other data set received from the other application has a different dependency on at least one further data set that has yet to arrive at the queue of the application;
  receiving, at the queue of the application, the further data set from the other application running within the distributed system; and
  wherein determining that the dependency has been satisfied comprises determining that the different dependency has been satisfied based at least in part on receiving the further data set from the other application running within the distributed system.

4. The method of claim 3, wherein gating the data set at the queue of the application comprises gating the data set at the queue of the application until both the other data set and the further data set have arrived at the queue of the application.

5. The method of claim 3, wherein the queue of the application enables the application to process the data set, the other data set, and the further data set in an order defined by the dependency irrespective of:
  the order in which the data set, the other data set, and the further data set arrive at the queue of the application; and
  the order in which the other application sends the data set, the other data set, and the further data set to the application.

6. The method of claim 1, further comprising rearranging, at the queue of the application, an order of the data set and the other data set in accordance with the dependency; and
wherein:
  determining that the dependency has been satisfied comprises determining that the dependency has been satisfied based at least in part on rearranging the order of the data set and the other data set in accordance with the dependency; and
  delivering the data set and the other data set to the application comprises feeding the data set and the other data set to the application for consumption in the order rearranged at the queue of the application.

7. The method of claim 1, wherein:
  receiving the data set from the other application running within the distributed system comprises receiving the data set from a first application running within the distributed system; and
  receiving the other data set from the other application running within the distributed system comprises receiving the other data set from a second application running within the distributed system.

8. The method of claim 1, wherein:
  receiving the data set from the other application running within the distributed system comprises receiving, at the queue of the application, the data set through a distributor component that:
    resides on the node within the distributed system; and
    facilitates data transfer on behalf of the application running on the node with respect to the distributed system.

9. The method of claim 8, further comprising directing the distributor component that facilitates data transfer on behalf of the application running on the node to send a further data set to another distributor component that:
  resides on the other node within the distributed system; and
  facilitates data transfer on behalf of the other application running on the other node with respect to the distributed system.

10. The method of claim 9, wherein directing the distributor component to send the further data set to the other distributor component that resides on the other node within the distributed system comprises directing the distributor component to send the further data set directly to the other distributor component such that the further data set does not need to travel through a centralized dependency management unit within the distributed system to be delivered to the other application running on the other node in a specific order.

11. The method of claim 1, wherein the queue of the application comprises a library used by the application to ensure delivery of data to the application in a specific order.

12. The method of claim 1, wherein the data set and the other data set each comprise an encapsulated data object outputted by the other application in response to input consumed by the other application.

13. The method of claim 1, further comprising providing the queue to the application to enable the application to rearrange an order of the data set and the other data set in accordance with the dependency without a centralized dependency management unit.

14. A system comprising:
  a receiving module, stored in a memory device, that:
    receives, at a queue of an application running on a node within a distributed system, a data set from at least one other application running on another node within the distributed system via an Optimal Flooding Protocol (OFP);

receives, at the queue of the application running on the node from the other application, metadata of the data set that is:
   described in a domain-specific language; and
   hoisted outside of the data set;
a determination module, stored in the memory device, that determines, based at least in part on the metadata of the data set at the queue of the application, that the data set received from the other application running on the other node has a dependency on at least one other data set that has yet to arrive at the queue of the application, wherein the dependency requires a most up-to-date version of the other data set;
a gating module, stored in the memory device, that gates, due at least in part to the dependency, the data set at the queue of the application running on the node at least until the most up-to-date version of the other data set arrives at the queue of the application running on the node;
wherein:
   the receiving module further receives, at the queue of the application running on the node, the other data set from the other application running on the other node within the distributed system;
   the determination module further determines that the dependency has been satisfied based at least in part on receiving the other data set at the queue of the application running on the node;
a delivery module, stored in the memory device, that delivers, in response to the determination that the dependency has been satisfied, the data set and the other data set to the application running on the node to enable the application to process the data set and the other data set in accordance with the dependency; and
at least one physical processor that executes the receiving module, the determination module, the gating module, and the delivery module.

15. The system of claim 14, wherein the determination module determines that the data set received from the other application has the dependency on the other data set by:
   searching the metadata for any dependencies of the data set received from the other application; and
   while searching the metadata, identifying the data set's dependency on the other data set.

16. The system of claim 14, wherein:
the determination module further determines, at the queue of the application, that the other data set received from the other application has a different dependency on at least one further data set that has yet to arrive at the queue of the application;
the receiving module further receives, at the queue of the application, the further data set from the other application running within the distributed system; and
the determination module determines that the dependency has been satisfied by determining that the different dependency has been satisfied based at least in part on receiving the further data set from the other application running within the distributed system.

17. The system of claim 14, further comprising a rearranging module, stored in the memory device, that rearranges, at the queue of the application, an order of the data set and the other data set in accordance with the dependency; and
wherein:
   the determination module determines that the dependency has been satisfied by determining that the dependency has been satisfied based at least in part on rearranging the order of the data set and the other data set in accordance with the dependency; and
   the delivery module delivers the data set and the other data set to the application by feeding the data set and the other data set to the application for consumption in the order rearranged at the queue of the application.

18. A non-transitory computer-readable medium comprising one or more computer-executable instructions that, when executed by at least one processor of a computing device, cause the computing device to:
   receive, at a queue of an application running on a node within a distributed system, a data set from at least one other application running on another node within the distributed system via an Optimal Flooding Protocol (OFP);
   receive, at the queue of the application running on the node from the other application, metadata of the data set that is:
      described in a domain-specific language; and
      hoisted outside of the data set;
   determine that the data set received from the other application running on the other node has a dependency on at least one other data set that has yet to arrive at the queue of the application, wherein the dependency requires a most up-to-date version of the other data set;
   gate, due at least in part to the dependency, the data set at the queue of the application running on the node at least until the most up-to-date version of the other data set arrives at the queue of the application running on the node;
   receive, at the queue of the application running on the node, the other data set from the other application running on the other node within the distributed system;
   determine that the dependency has been satisfied based at least in part on receiving the other data set at the queue of the application running on the node; and
   deliver, in response to the determination that the dependency has been satisfied, the data set and the other data set to the application running on the node to enable the application to process the data set and the other data set in accordance with the dependency.

* * * * *